United States Patent [19]

Baker et al.

[11] Patent Number: 4,567,051

[45] Date of Patent: Jan. 28, 1986

[54] METHOD FOR PRODUCING SNACKS FROM DOUGH

[75] Inventors: John E. Baker, Farmers Branch; David P. Fowler, Irving, both of Tex.

[73] Assignee: Frito-Lay, Inc., Dallas, Tex.

[21] Appl. No.: 439,214

[22] Filed: Nov. 4, 1982

[51] Int. Cl.⁴ .............................................. A21D 8/00
[52] U.S. Cl. ................................... 426/438; 426/439; 426/516; 99/403
[58] Field of Search ............... 426/438, 439, 458, 496, 426/502, 516, 518, 808

[56] References Cited

U.S. PATENT DOCUMENTS

| | | |
|---|---|---|
| 3,020,162 | 2/1962 | Cunningham et al. |
| 3,114,639 | 12/1963 | Rivoche. |
| 3,149,978 | 9/1964 | Anderson et al. |
| 3,935,322 | 1/1976 | Weiss et al. ........................ 426/439 |
| 3,937,848 | 2/1976 | Campbell et al. ................... 426/439 |
| 3,966,983 | 6/1976 | Dexter et al. |
| 4,126,706 | 11/1978 | Hilton ................................. 426/438 |
| 4,183,966 | 1/1980 | Mickle et al. ...................... 426/439 |
| 4,269,861 | 5/1981 | Caridis et al. ..................... 426/438 |
| 4,285,979 | 8/1981 | Izzi ..................................... 426/439 |

Primary Examiner—Raymond Jones
Assistant Examiner—Marianne M. Cintins
Attorney, Agent, or Firm—Bernard, Rothwell & Brown

[57] ABSTRACT

In the production of snacks such as chips from farinaceous dough, the dough is extruded into a ribbon, rope, web or the like which is partially fried and then cut into pieces. The pieces are further fried or processed to form the snacks.

15 Claims, 4 Drawing Figures

4,567,051

METHOD FOR PRODUCING SNACKS FROM DOUGH

BACKGROUND OF THE INVENTION

1. Field of the Invention

The present invention relates to methods and apparatus for producing snacks, such as fried chips, from dough by forming the dough into a continuous elongated form, such as a ribbon, web, rope or the like, which is cut into pieces for frying or other further processing to form the snacks.

2. Description of the Prior Art

A variety of farinaceous dough materials are used in the production of snack products. Such snack doughs are typically made up of corn meal, potato meal or flour meal, although other starch-containing doughs may be used. The water and starch content of dough will determine many characteristics of the finished snack product and the handling characteristics of the dough before it is cooked. For some snack products, the dough material used is sticky and therefore it tends to adhere to cutting equipment used to divide the dough into snack-sized pieces. In addition to adhering to cutting equipment, individual pieces of dough often stick together during frying, resulting in an undesirable multi-component product.

To overcome the sticking problems, emulsifiers have been added to the dough material to alter the texture and sticking characteristics of the dough. Examples of such emulsifiers include lecithin, monoglycerides and diglycerides. Using emulsifiers increases the cost of snack product production and may alter the texture or even the taste of a finished product.

SUMMARY OF THE INVENTION

An object of the present invention is to overcome the problem of dough sticking to cutting mechanisms and of dough pieces sticking to one another during a cooking process, without using emulsifiers or other additives.

To overcome problems associated with the stickiness of dough prior to cooking, sheets, ribbons or ropes of dough material are treated or partially fried with hot vegetable oil prior to cutting. This is accomplished by feeding extruded or sheeted dough in substantially continuous sheets or ribbons into a guide tube filled with concurrently flowing hot oil moving at a controlled velocity. Cutting equipment positioned at the outlet of the guide tube cuts the dough after it passes through the guide tube and before the dough is finally cooked.

DETAILED DESCRIPTION OF THE PREFERED EMBODIMENT

Figure 1:
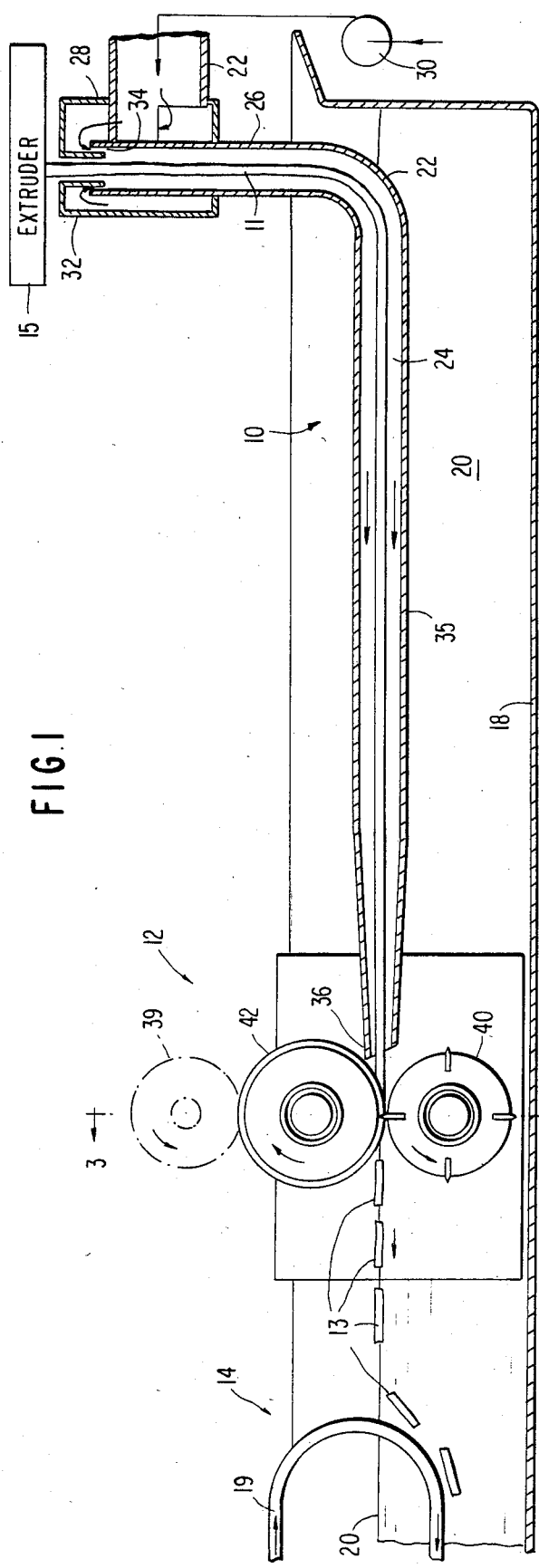
FIG. 1 is a diagram of a portion of a chip producing apparatus in accordance with the invention wherein portions are illustrated in elevational sectional form and other portions are illustrated schematically.

As illustrated in FIG. 1, an apparatus for producing snacks, such as chips, in accordance with one embodiment of the invention includes treating or prefrying facilities indicated generally at 10 for treating or partially frying a continuous form, such as ribbon 11, of farinaceous dough. A cutting mechanism, indicated generally at 12, is positioned to receive and cut the partially fried ribbon 11 into pieces 13 which are then further processed, for example by frying mechanism indicated generally at 14, to produce the snacks. The treating or partial frying of the ribbon 11 substantially reduces sticking of the dough to the cutting mechanism 12 and reduces sticking of the pieces 13 to each other during further frying.

The ribbon 11 is formed from dough in a conventional manner, for example by extruding and ribbon forming mechanism 15. The dough is formed from a mixture including a material, such as corn meal, potato meal, flour meal, or the like, which is rich in starch and tends to form a sticky dough.

The frying mechanism 14 is a conventional chip frying mechanism which has been modified to receive and support the treating mechanism 10 and the cutting mechanism 12 within an extension or portion 18 of the frying vat. Submerger 19 of the frying mechanism is positioned adjacent the discharge of the cutting mechanism 12 to submerge and advance the pieces 13 in the hot oil 20 in the vat of the fryer 14.

Figure 2:
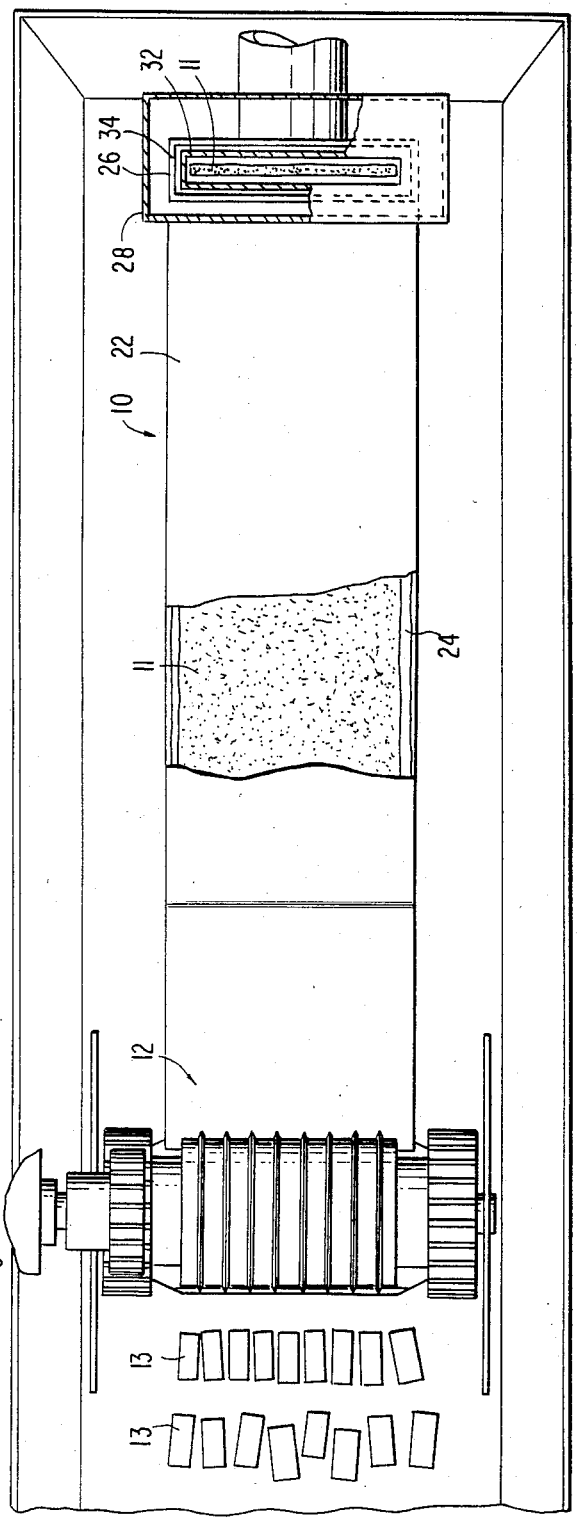
FIG. 2 is a plan view of a portion of the apparatus shown in FIG. 1.

As shown in FIGS. 1 and 2, the treating mechanism 10 includes an elongated L-shaped tubular guide member 22 which has a flattened or rectangular cross section forming an interior passageway and chamber 24 of suitable size and shape, larger than the cross section of ribbon 11, for freely passing the ribbon 11 along with a stream of hot oil. The vertical leg 26 forms the entrance end of the chamber 24 and is connected to a head box 28 to which hot oil from the fryer 14 is supplied by a pump 30. An upper portion 32 of the box extends above the receiving end of the chamber 24 and has provisions such as openings 34 for discharging oil on all sides of the ribbon 11 as it enters the chamber 24 to form a stream in the tubular member 22 carrying the ribbon 11 therethrough. The height of the vertical leg 26 and the volume of hot oil discharged from the head box 28 are selected to produce a velocity of oil in the chamber 24 which is equal to or preferably greater than the velocity of the ribbon 11 entering and passing through the chamber 24. The horizontal leg 35 of the member 24 runs generally level with the top surface of the oil 20 in the vat 18 and has a length selected, in conjunction with the length of the vertical leg 26, to produce a desired amount of treatment or prefrying of the ribbon 11. The discharge end 36 of the tube 22 and leg 35 is tapered by a selected degree to produce a desired increase in velocity of the exiting hot oil and produce a stream of hot oil passing through the cutter 12 and into the further frying zone 14 for carrying the discharging ribbon 11 into the cutter and for carrying the cut pieces 13 from the cutter 12 to the submerger 19.

Figure 3:
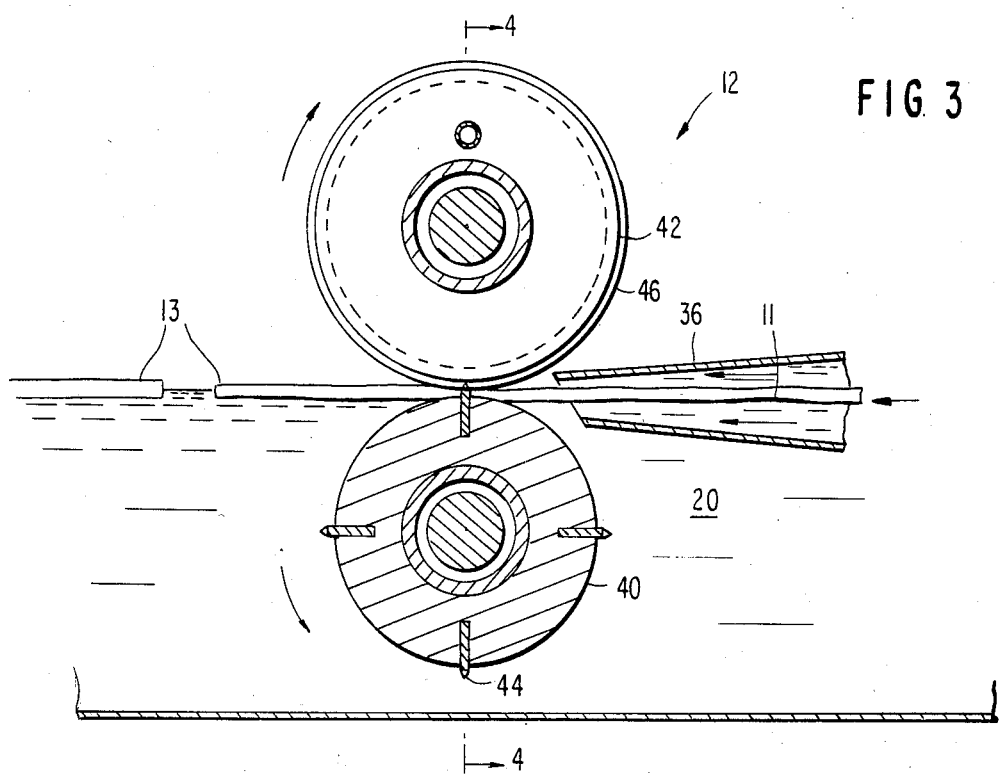
FIG. 3 is an enlarged elevational section view of a cutting mechanism in the apparatus of FIGS. 1 and 2, the section taken at line 3—3 in FIG. 4.
Figure 4:
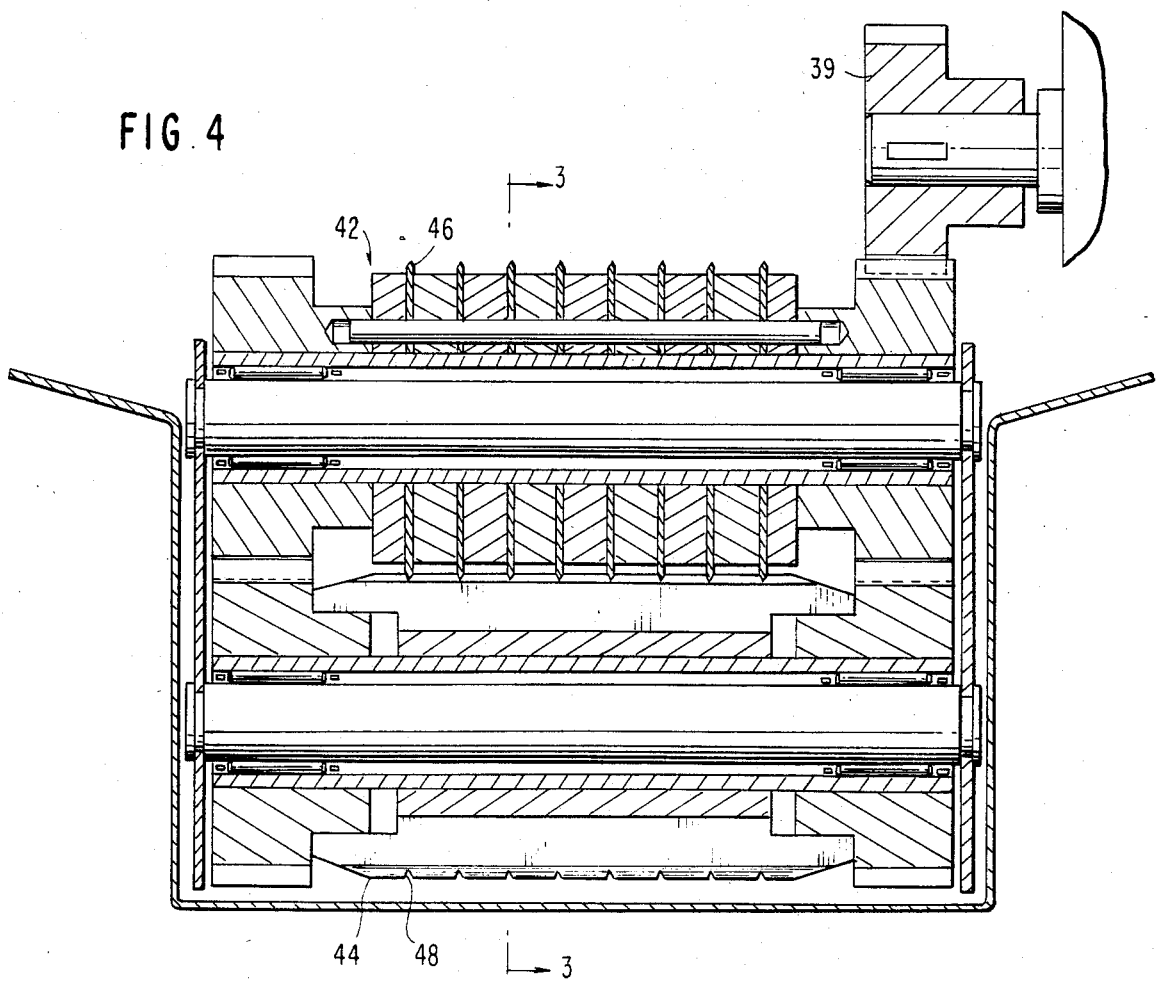
FIG. 4 is a section view taken at line 4—4 of FIG. 3.

As shown in FIGS. 2, 3 and 4, the cutting mechanism 12 includes drive gear 39 for turning upper roll 42 and lower roll 40. The drive gear 39 is connected to a drive source such as a motor (not shown). The upper roll 42 is provided with a series of circumference blades 46 positioned a uniform distance from each other and extending around the circumference of the upper roll. The lower roll 40 includes longitudinal blades 44 extending along the longitudinal axis of the back-up roll 40. The circumference blades and longitudinal blades protrude out from the surface of the upper roll and back-up roll respectively. Each longitudinal blade 44 is notched with grooves 48 as illustrated in FIG. 4, to receive circumference blades 46. The circumference blades continuously contact the surface of back-up roll 40 until a longitudinal blade 44 engages the circumference blades, severing the dough such that the circumference blades continuously cut the dough 11 into strips while longitudinal blades sever the dough strips into the desired length. The cutting mechanism 12 is partially submerged in the oil bath 20 so that the nip defined by the rolls 40 and 42 is generally in the plane of the top surface of the oil bath.

In operation, a continuous ribbon 11 of dough material is fed into the receiving end 26 of guide chamber 24 at a substantially uniform rate. Hot oil 20 is pumped into hot oil box 28 and through openings 34 into guide chamber 24 on all sides of the ribbon 11. The hot oil flows through the guide tube 22 at a faster rate than the dough ribbon 11. The faster moving hot oil carries the ribbon 11 through guide chamber 24 and, together with the oil surrounding the ribbon, prevents sticking of dough material to the sides of the guide tube 22. The acceleration of the hot oil by the tapered discharge opening 36 ensures a stream in the bath 20 for carrying the ribbon 11 to the cutter 12. As best illustrated in FIGS. 2, 3 and 4, the partially fried sheet of dough material 11 is divided into strips of dough having a uniform width by circumference blades 46 on the upper roll 42. Blades 44 of lower roll 40 cooperate with the circumference blades 46 of the upper roll 42 to cut the strips of dough material into the pieces 13 of dough material of the desired length. When the blade 44 does not engage a longitudinal blade 46, the blades 46 of upper cutting roll contacts the surface of the back-up roll 40.

The pieces 13 of dough material are then propelled by the stream from discharge end 36 to the frying section 14 where the pieces 13 are cooked or fried into final form by submersion in hot oil contained in vat 18. The cooked snacks are removed in a manner as is well known in the art.

With this invention, the ribbon 11 of dough is treated or partially fried by hot vegetable oil in guide chamber 24 before it is cut or cooked into a final snack product. This treatment or prefrying with hot oil modifies the handling characteristics of sticky farinaceous dough, preventing the dough from sticking to cutting mechanisms and preventing dough pieces leaving the cutting equipment from sticking together during further cooking. The use of emulsifiers to modify dough-handling characteristics is therefore unnecessary.

Various modifications, variations and changes in detail may be made to the above described embodiment. For example, the above disclosed embodiment forms the dough into a ribbon or sheet for cutting into pieces to be fried into chips. However, the present invention can be utilized with other continuous forms, such as webs, ropes, or rods of dough to be cut into pieces which are fried into snacks; the cross section of the treating or prefrying chamber 24 would accordingly be modified. The prefrying, cutting and further frying facilities or mechanisms in the above embodiment are joined into a single unit; separate prefrying, cutting and/or further cooking facilities or mechanisms could alternatively be utilized in the invention.

Since many modifications, variations and changes may be made in the disclosed embodiment, it is intended that the foregoing description and accompanying drawings be interpreted as illustrative and not in a limiting sense.

What is claimed is:

1. A method for forming snacks from sticky dough, comprising:
   (a) forming sticky dough into a continuous elongated form, and
   (b) thereafter continuously frying the dough in hot frying oil for a period of time sufficient to partially cook the dough,
wherein, during the continuous partial frying of the dough,
   the continuous elongated form is first surrounded by and transported by a stream of hot oil which partially fries the dough sufficiently to reduce the stickiness of the dough, then,
   the continuous elongated form is cut into snack size pieces while being transported in the stream of hot oil and before the dough is fully cooked, then,
   the snack size pieces are transported in the stream of hot oil to a further zone in the frying oil, then,
   (c) the snack size pieces are submerged in the further zone of hot frying oil for a period of time sufficient to finish fry to form snacks.

2. The method of claim 1 wherein the sticky dough is extruded to form said continuous elongated form.

3. The method of claim 1 wherein said elongated form is a sheet, ribbon, rope or web.

4. The method of claim 1 wherein the dough comprises starch-containing material.

5. The method of claim 4 wherein the dough comprises corn meal, potato meal, flour meal or mixtures thereof.

6. The method of claim 1 wherein after the dough is formed into a continuous elongated form, the elongated form is fed into a guide tube filled with hot frying oil flowing in a direction concurrently with the elongated form, and wherein in said guide tube said elongated form is partially fried sufficiently to reduce the stickiness of the dough.

7. The method of claim 6 wherein the hot oil in the guide tube has a velocity which is equal to or greater than a velocity of the elongated form.

8. The method of claim 6 wherein the guide tube has a generally vertical leg into which the elongated form is fed, and a generally horizontal leg out of which the elongated form exits.

9. The method of claim 8 wherein the hot oil in the guide tube has a velocity which is equal to or greater than a velocity of the elongated form.

10. The method of claim 9 wherein the elongated form is cut after passing out of an outlet of said guide tube.

11. The method of claim 10 wherein said outlet is tapered to increase the velocity of hot oil exiting the guide tube outlet.

12. The method of claim 8 wherein the generally horizontal leg of the guide tube is at about a level with a top surface of said further zone in the frying oil.

13. The method of claim 12 wherein the hot oil in the guide tube has a velocity which is equal to or greater than a velocity of the elongated form.

14. The method of claim 13 wherein the elongated form is cut after passing out of an outlet of said guide tube.

15. The method of claim 14 wherein said outlet is tapered to increase the velocity of hot oil exiting the guide tube outlet.

* * * * *